Oct. 1, 1968  J. X. OLIVEIRA  3,403,924
TRAILER
Filed July 26, 1966  2 Sheets-Sheet 1
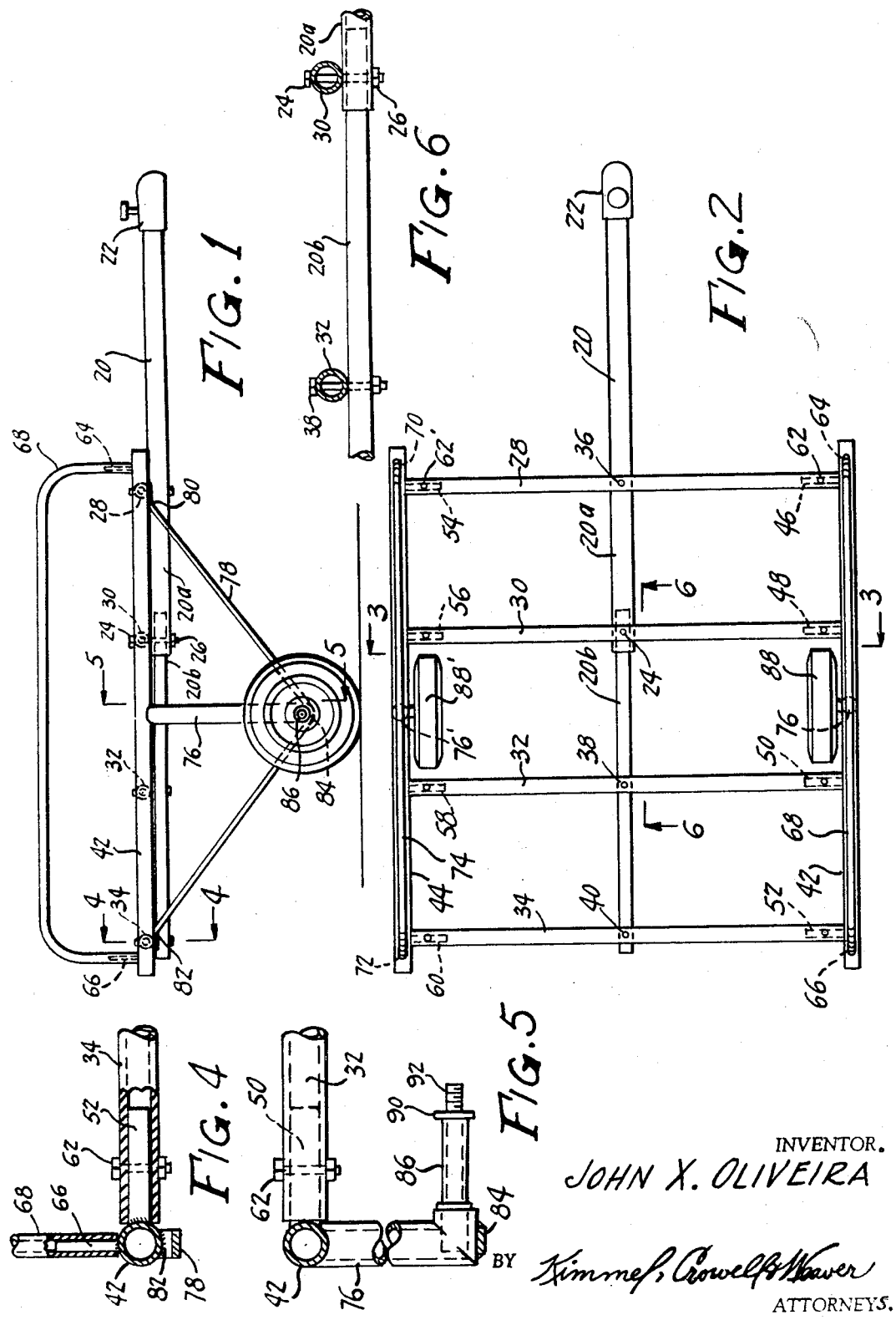
INVENTOR.
JOHN X. OLIVEIRA
BY Kimmel, Crowell & Weaver
ATTORNEYS.

Oct. 1, 1968
J. X. OLIVEIRA
3,403,924
TRAILER
Filed July 26, 1966
2 Sheets-Sheet 2
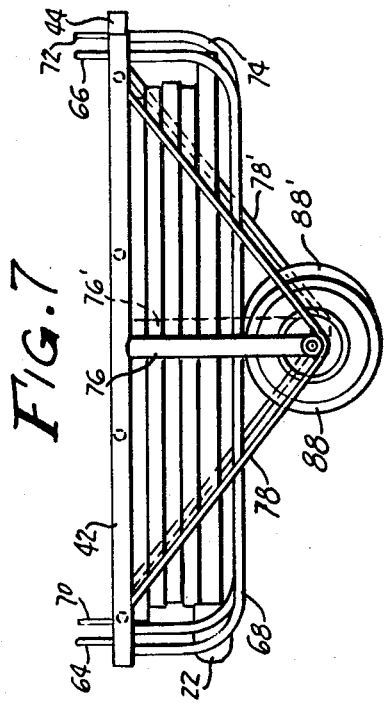
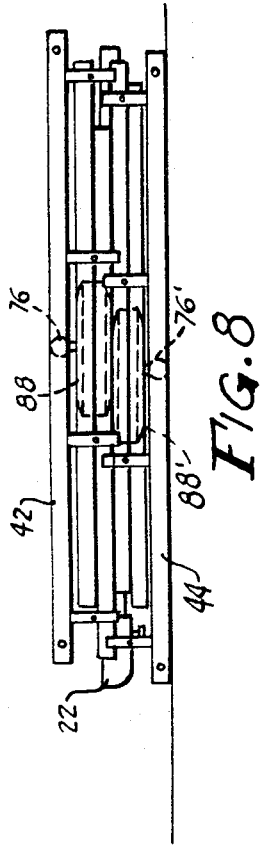
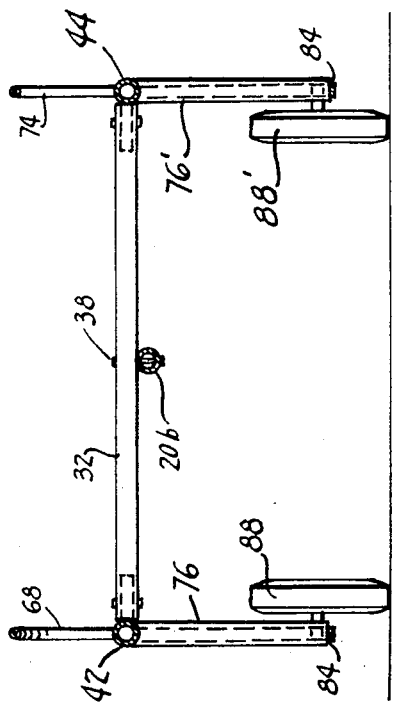
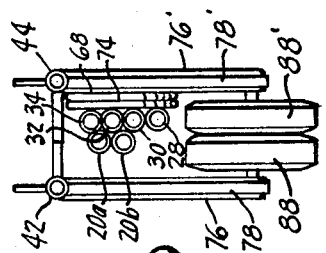
INVENTOR.
JOHN X. OLIVEIRA
BY *Kimmel, Crowell & Weaver*
ATTORNEYS.

United States Patent Office 3,403,924
Patented Oct. 1, 1968

3,403,924
TRAILER
John X. Oliveira, 9348 NW. 22nd Ave.,
Miami, Fla. 33147
Filed July 26, 1966, Ser. No. 567,871
2 Claims. (Cl. 280—63)

ABSTRACT OF THE DISCLOSURE

A trailer which may be easily disassembled and assembled comprising a pair of side assemblies each including a side bar, a wheel support member extending downwardly from the side bar, a reinforcing strap secured from the ends of the side bar to the bottom of the wheel support member, a wheel rotatably supported at the bottom of the wheel support member, dowels extending inwardly from each of the side assemblies, a plurality of tubular cross bars secured by the dowels transversely of the trailer and a two-piece tongue secured to the front and rear cross bars and an intermediate cross bar and extending forwardly with a hitch thereon for securement to a draft vehicle is disclosed.

This invention relates to a load-carrying trailer which is easily assemblable and disassemblable.

Trailers are known in the prior art which are collapsible or which may be in part disassemblable. These trailers are generally heavy and therefore inconvenient to handle. It is an object of this invention to provide a trailer which may be quickly and easily assembled and disassembled and which is lightweight for convenience in handling and is disassemblable and collapsible to a small volume for ease in storage.

An additional object of this invention is the provision of a trailer which is lightweight in operation and yet sturdy and capable of carying heavy loads.

A further object of this invention is the provision of a trailer which has a plurality of elongate members of approximately the same length for ease in storage in the disassembled position.

A further object of this invention is the provision of a trailer which may be disassembled and stored in a distance approximately equal to the length of the trailer and of considerable less width than the assembled trailer.

Yet another object of this invention is the provision of a trailer having a single central shaft about which the trailer is assembled and disassembled.

Another object of this invention is the provision of a trailer having a single shaft which is segmented for ease in storage along with other components of the trailer.

An additional object of this invention is the provision of structural features and arrangements which permit easy assembly and disassembly of the trailer and compact storage and handling thereof in the disassembled condition.

Additional objects of this invention will appear from the following specification and the drawings to which reference is now made.

In the drawings:

FIGURE 1 is a side view of the trailer of this invention.

FIGURE 2 is a top view of the trailer of this invention.

FIGURE 3 is an end view in partial cross-section taken substantially along lines 3—3 of FIGURE 2.

FIGURE 4 is a detail of the interconnection of the sidebars and crossbars and guardbar of this invention taken substantially along line 4—4 as shown in FIGURE 1.

FIGURE 5 is an end view in partial cross-section showing the wheel support rod and wheel support mounting mechanism, with the wheel removed, taken substantially along line 5—5 of FIGURE 1.

FIGURE 6 is the central shaft interconnection arrangement in partial cross-section taken substantially along line 6—6 of FIGURE 2.

FIGURE 7 is a side view of the trailer in collapsed position.

FIGURE 8 is a top view of the trailer in disassembled or collapsed position.

FIGURE 9 is an end view of the trailer in disassembled or collapsed position.

The trailer of this invention is constructed of a plurality of elongate members. In general, tubular members, such as tubular steel, are preferred for the construction of this trailer; however, other construction materials, such as other metals or solid rods or similar elongate members, may be used in the construction of this trailer. Greatest sturdiness and rigidity as well as light weight is achieved by using strong tubular steel members throughout.

The trailer of this invention comprises a central shaft 20 about which the trailer is constructed. Central shaft 20 carries on its forward end, which extends forwardly of the trailer a desired distance, a trailer hitch 22 which may be of any conventional design for connecting the trailer to a drive vehicle, such as a car, pickup, tractor, or any other desired vehicle. Central shaft 20 comprises two subcomponents 20A which is a tubular steel member and 20B, which is in a preferred embodiment, a tubular steel member of smaller diameter which may be slidably received in the rearward end of member 20A. Central shaft 20, comprising elements 20A and 20B, extends the length of the trailer and the desired distance in front thereof. The two elements, 20A and 20B of central shaft 20 are interconnected and connected to the trailer by a frictional fastener such as a bolt 24 and nut 26. This fastening means is preferably demountable to permit easy assembly and disassembly. Nut 26 may, of course, be a wing nut for easy handling and a retaining pin or lock washer, not shown, may be included as good mechanical workmanship may require.

As best shown in FIGURE 2, the trailer includes a plurality of crossbars 28, 30, 32 and 34 which, in the preferred embodiment, are steel tubes. These crossbars run transversely of the trailer substantially at right angles to the central shaft 20 and are demountably interconnected with central shaft 20 by frictional fasteners, such as 24 which, in addition, interconnect the two elements of central shaft 20. These frictional fasteners such as 24, 36, 38 and 40 may be bolts or other fasteners which, in a preferred embodiment, provide a demountable pivotal interconnection between the center of the crossbars and the central shaft.

A pair of sidebars 42 and 44 are provided along each side of the trailer which are interconnected with the crossbars. The interconnection between these sidebars and crossbars is preferably formed by fixedly securing a plurality of dowels, such as dowels 46, 48, 50 and 52, to a sidebar 42. These dowels are slidably received in the tubular crossbars 28, 30, 32 and 34 and may be secured demountably therein by frictional fasteners shown generally at 62. Sidebar 44 includes fixedly secured thereto a plurality of dowels 54, 56, 58 and 60 which are secured to the crossbars in a similar manner.

As thus shown in FIGURE 1, the sidebar 42 may include a dowel 64 projecting upwardly therefrom at the front end and a dowel 56 similarly projecting upwardly at the rear of the trailer. A side guardbar 68 may be slidably received over the dowels 64 and 66. While not an essential part of this invention, it is desirable that the side guardbar 68 be generally U-shaped to provide sides for the trailer. In a similar manner, dowels 70 and 72 and side guardbar 74 are provided on sidebar 44. The relation between the dowels used to connect the sidebars to the crossbars and the dowels used to connect the guardbar is shown in greater detail in FIGURE 4.

The trailer also includes on each of the sidebars 42 and 44, a downwardly projecting wheel support bar 76 which is shown connected to sidebar 42. This wheel support bar 76 may be welded or otherwise fixedly secured to the sidebar 42. The wheel support bar is given additional support in the line of travel or direction of travel by a steel strap 78 which is welded or otherwise fixedly secured to sidebar 42 at points 80 in the front and 82 in the rear and is also welded or secured to the lower end of the wheel support bar 76 at point 84. The wheel support bar carries at its lower end means for rotatably mounting a wheel thereon which may comprise an axle member 86, which rotatably supports wheel 88, retaining washer 90 and a threaded end 92 for a retaining nut. Of course, any convenient means for mounting a wheel may be provided. In a similar manner, a wheel 88' is connected to the lower end of wheel support bar 76' which is secured to sidebar 44. The relation of the wheels, wheel support bars, sidebars, and crossbars and the central shaft is thus shown in FIGURE 3.

Since the securing means between the central shaft elements 20A and 20B and the crossbars 28, 30, 32 and 34, and the sidebars 42 and 44 as well as the guardbars 68 and 74, are all demountable, it will be apparent that the trailer may be easily and quickly disassembled and arranged for compact storage or transportation. Since the components of the trailer, in the preferred embodiment, are made of tubular steel or perhaps even tubular aluminum in some cases, the lightweight compactness of the trailer will be apparent to those skilled in the art. As best shown in FIGURES 7, 8 and 9, the trailer may be disassembled and collapsed to a storage position which is substantially the same length as the trailer body itself and which is considerably narrower and shorter, thereby occupying a minimum of storage and transportation space.

Trailers of this nature will find many varied and valuable applications. For example, such trailers may conveniently be used by a family which makes infrequent camping trips or long distance trips where additional carrying space for luggage, camping equipment, or other items is required. One of the major problems in the purchase of trailers in the past has been the difficulty of finding adequate storage space for the trailer during the non-use period. The trailer of this invention largely solves this problem since the trailer may be disassembled easily and stored in a closet, garage or any other convenient storage area of relatively small size.

The trailer may find valuable application where it is necessary to transport materials to job sites. For example, plumbers, carpenters, and other tradesmen will find the trailer of great value in getting their materials to the job site where the work must be done. The trailer may be then conveniently disassembled and carried back in the pickup or in the trunk of a car.

The advantages of the trailer as a whole, its constructional features as a whole and many of the individual constructional features will be apparent to those skilled in While this invention has been described with relation to a specific embodiment, it will be understood that the embodiment is intended as merely exemplary and not in a limiting sense. Obvious changes will appear to those skilled in the art and may be made without departing from the spirit of the invention. It is intended that the scope of the invention be defined and limited only by the appended claims.

I claim:
1. A disassemblable two-wheel trailer comprising:
right and left side assemblies, each of said assemblies comprising
an elongate linear side support member,
a wheel supporting member secured proximate the center of the side support member and extending downwardly therefrom,
a trailer wheel rotatably mounted on the bottom end of the wheel supporting member,
a strap secured proximate the ends of the side member extending from each end downwardly to the wheel mount at the bottom of the wheel supporting member and being secured thereto for bracing the wheel supporting member in the direction of travel, and
a plurality of dowels secured on the inside of the side support member and extending inwardly therefrom;
front and rear cross bars demountably secured, respectively, between the responsive front and rear ends of the side assemblies by said dowels and at least one intermediate cross bar secured between the side assemblies, said cross bars extending perpendicularly to the side assemblies and the line of travel and forming the load supporting portion of the trailer;
a tongue assembly comprising a first member extending forwardly of the side assemblies, including means on the forward end thereof for securing the trailer tongue to a draft vehicle, a second member demountably secured to the rearwardly end of the first member; and
means demountably securing the first member to the front cross bar, the second member to the rear cross bar and both first and second members to the intermediate cross bar.
2. The invention of claim 1 wherein the means for securing the cross bars to the tongue includes a demountable frictional fastener for pivotally interconnecting the respective cross bars to the tongue.

References Cited
UNITED STATES PATENTS

| | | | |
|---|---|---|---|
| 2,524,633 | 10/1950 | Orjala | 296—35 |
| 2,594,540 | 4/1952 | Cole et al. | 280—34 |
| 2,938,735 | 5/1960 | Bennett | 280—34 |
| 3,239,274 | 3/1966 | Weiss | 298—17 |

BENJAMIN HERSH, *Primary Examiner.*
J. SIEGEL, *Assistant Examiner.*